United States Patent
Jamison et al.

(10) Patent No.: US 11,050,804 B2
(45) Date of Patent: *Jun. 29, 2021

(54) SERVICING GROUP-BASED COMMUNICATION WORKSPACE ADD REQUESTS WITHIN A GROUP-BASED COMMUNICATION SYSTEM

(71) Applicant: Slack Technologies, Inc., San Francisco, CA (US)

(72) Inventors: Britton Jamison, San Francisco, CA (US); Ryan Morris, Alameda, CA (US); Shivnag Kilaru, San Francisco, CA (US); Smruthi Tatachar Venkatesh, Newark, CA (US); Sharath Upadhya, Fremont, CA (US)

(73) Assignee: Slack Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/082,569

(22) Filed: Oct. 28, 2020

(65) Prior Publication Data

US 2021/0044638 A1     Feb. 11, 2021

Related U.S. Application Data

(63) Continuation of application No. 16/526,618, filed on Jul. 30, 2019, now Pat. No. 10,862,931.

(51) Int. Cl.
*H04L 12/58*     (2006.01)
*H04L 29/06*     (2006.01)

(52) U.S. Cl.
CPC ........ *H04L 65/4053* (2013.01); *H04L 51/043* (2013.01); *H04L 51/12* (2013.01); *H04L 51/22* (2013.01)

(58) Field of Classification Search
CPC . H04L 65/403; H04L 65/4053; H04L 63/104; H04L 12/1818; H04L 12/1822; H04L 67/1046; H04L 67/1044; H04L 51/043; H04L 51/12; H04L 51/22
USPC .......................................................... 709/206
See application file for complete search history.

(56) References Cited

U.S. PATENT DOCUMENTS

| | | | | |
|---|---|---|---|---|
| 8,576,750 | B1* | 11/2013 | Hecht | H04M 3/56 370/261 |
| 9,264,246 | B2* | 2/2016 | Li | H04L 12/1822 |
| 2005/0125277 | A1* | 6/2005 | Estrada | G06Q 10/10 705/301 |
| 2012/0005728 | A1* | 1/2012 | Farrell | G06Q 10/00 726/4 |
| 2013/0311598 | A1* | 11/2013 | Arrouye | H04L 67/1097 709/217 |
| 2014/0324993 | A1* | 10/2014 | Li | H04L 12/1818 709/206 |
| 2017/0193447 | A1* | 7/2017 | Piyush | G06Q 10/103 |
| 2018/0183619 | A1* | 6/2018 | Jayaram | H04W 12/02 |
| 2018/0197144 | A1* | 7/2018 | Frank | H04W 12/08 |
| 2018/0212903 | A1* | 7/2018 | Rose | G06F 16/955 |

\* cited by examiner

*Primary Examiner* — Ruolei Zong
(74) *Attorney, Agent, or Firm* — Erise IP, P.A.

(57) ABSTRACT

Embodiments of the present disclosure provide methods, systems, apparatuses, and computer program products for servicing a group-based communication workspace add request within a group-based communication system.

20 Claims, 11 Drawing Sheets

SERVICING GROUP-BASED COMMUNICATION WORKSPACE ADD REQUESTS WITHIN A GROUP-BASED COMMUNICATION SYSTEM

RELATED APPLICATIONS

This patent application is a continuation application claiming priority benefit, with regard to all common subject matter, of U.S. patent application Ser. No. 16/526,618, filed Jul. 30, 2019, and entitled "SERVICING GROUP-BASED COMMUNICATION WORKSPACE ADD REQUESTS WITHIN A GROUP-BASED COMMUNICATION SYSTEM" ("the '618 application"). The identified earlier-filed patent application is hereby incorporated by reference in its entirety into the present application.

BACKGROUND

Systems have been provided for supporting communication and collaboration among a plurality of client devices. Applicant has identified a number of deficiencies and problems associated with inviting new users to a virtual communications environment with restricted access, especially in a large company or large work team setting where the administrator of such an environment may not be readily available. Through applied effort, ingenuity, and innovation, many of these identified problems have been solved by developing solutions that are included in embodiments of the present disclosure, many examples of which are described in detail herein.

BRIEF SUMMARY

This specification relates to methods, systems, apparatuses, and computer program products for an apparatus configured to service a group-based communication workspace add request within a group-based communication system, the group-based communication system comprising a plurality of group-based communication channels organized among a plurality of group-based communication workspaces. The apparatus comprises at least a processor, and a memory associated with the processor having computer coded instructions therein, with the computer coded instructions configured to, when executed by the processor, cause the apparatus to add a group-based communication workspace identifier to a group-based communication approved workspaces list associated with a group-based communication user identifier.

In one embodiment, an apparatus is configured to service a group-based communication workspace add request within a group-based communication system. In embodiments, the group-based communication system comprises a plurality of group-based communication channels organized among a plurality of group-based communication workspaces. In embodiments, the apparatus comprises at least a processor, and a memory associated with the processor having computer coded instructions therein, with the computer coded instructions configured to, when executed by the processor, cause the apparatus to service the group-based communication workspace add request.

In embodiments, the apparatus is configured to receive, from a first client device associated with a first group-based communication user identifier, the group-based communication workspace add request. In embodiments, the group-based communication workspace add request comprises a group-based communication workspace identifier and a second group-based communication user identifier.

In embodiments, the apparatus is configured to assign a group-based communication channel identifier to the group-based communication workspace add request. In embodiments, the group-based communication channel identifier is associated with a group-based communication channel having a group-based communication administrator as a member.

In embodiments, the apparatus is configured to render the group-based communication workspace add request within a group-based communication channel interface associated with the group-based communication channel identifier.

In embodiments, the apparatus is configured to, upon receiving, from a third client device associated with a group-based communication administrator, a positive group-based communication workspace add request decision, transmit a group-based communication workspace invite to a second client device associated with the second group-based communication user identifier.

In embodiments, the apparatus is configured to, upon receiving, from the second client device associated with the second group-based communication user identifier, a group-based communication workspace invite acceptance, add the group-based communication workspace identifier to a group-based communication approved workspaces list associated with the second group-based communication user identifier.

In another embodiment, the apparatus is further configured to, prior to assigning a group-based communication channel identifier to the group-based communication workspace add request, and upon determining that one or more of the first client device associated with a first group-based communication user identifier or the second group-based communication user identifier associated with the group-based communication workspace add request is associated with a whitelist, automatically transmit the group-based communication workspace invite to the second client device. In another embodiment, the identifiers are associated with a blacklist.

In one embodiment, the group-based communication workspace add request comprises a plurality of group-based communication workspace add requests associated with a common group-based communication user identifier wherein the plurality of group-based communication workspace add requests are consolidated into a group-based communication workspace add request batch. In embodiments, the group-based communication workspace add request batch is assigned a group-based communication channel identifier.

In embodiments, the apparatus is further configured to cause to render the group-based communication workspace add request within a group-based communication channel interface associated with the group-based communication channel identifier.

In another embodiment, the group-based communication workspace invite comprises a redirect to a validated external resource for completion of pre-access requirements. In embodiments, the pre-access requirements are completed prior to adding the group-based communication workspace identifier to the group-based communication approved workspaces list for the second group-based communication user identifier.

In another embodiment, the apparatus is further configured to, upon receiving, from a third client device associated with a group-based communication administrator, a positive group-based communication workspace add request decision, transmit to the first client device associated with a first group-based communication user identifier the positive group-based communication workspace add request decision.

BRIEF DESCRIPTION OF THE DRAWINGS

Having thus described the invention in general terms, reference will now be made to the accompanying drawings, which are not necessarily drawn to scale.

Figure 1:
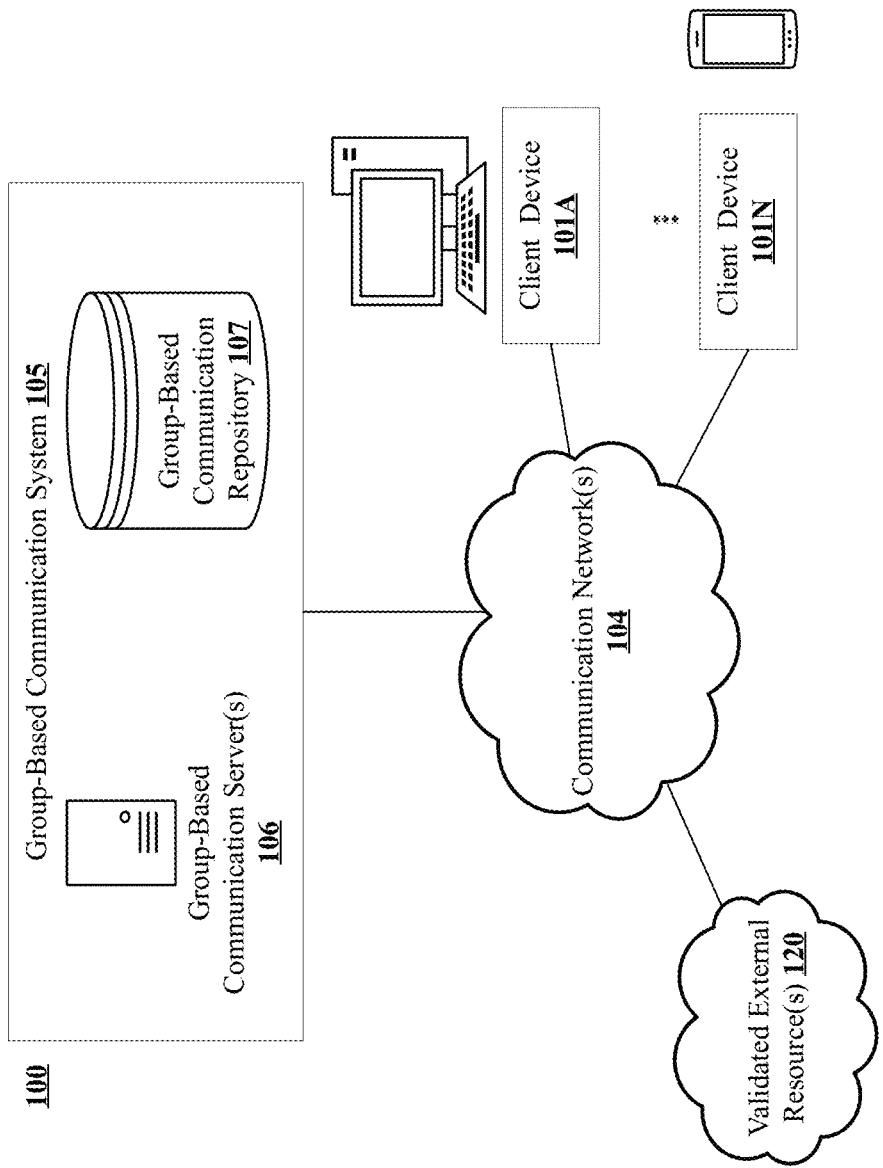

FIG. 1 is a system architecture diagram of an example group-based communication system configured to practice embodiments of the present disclosure.

Figure 2:
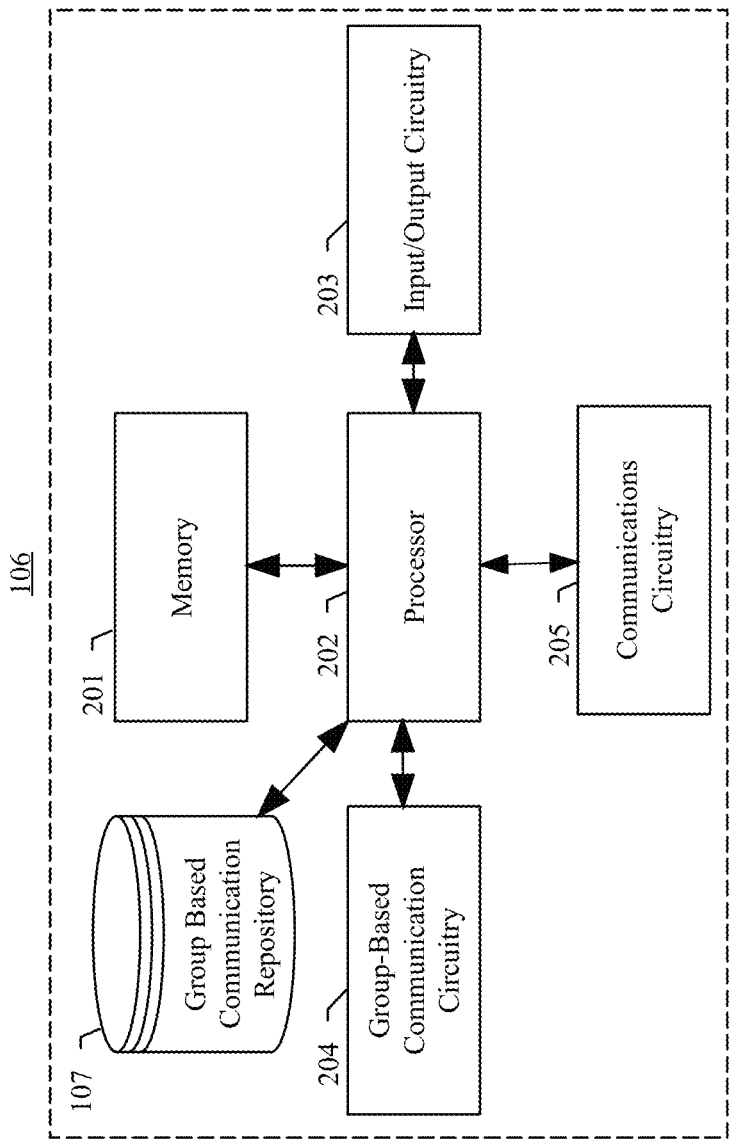

FIG. 2 is an example schematic diagram of a group-based communication server according to one embodiment of the present disclosure.

Figure 3:
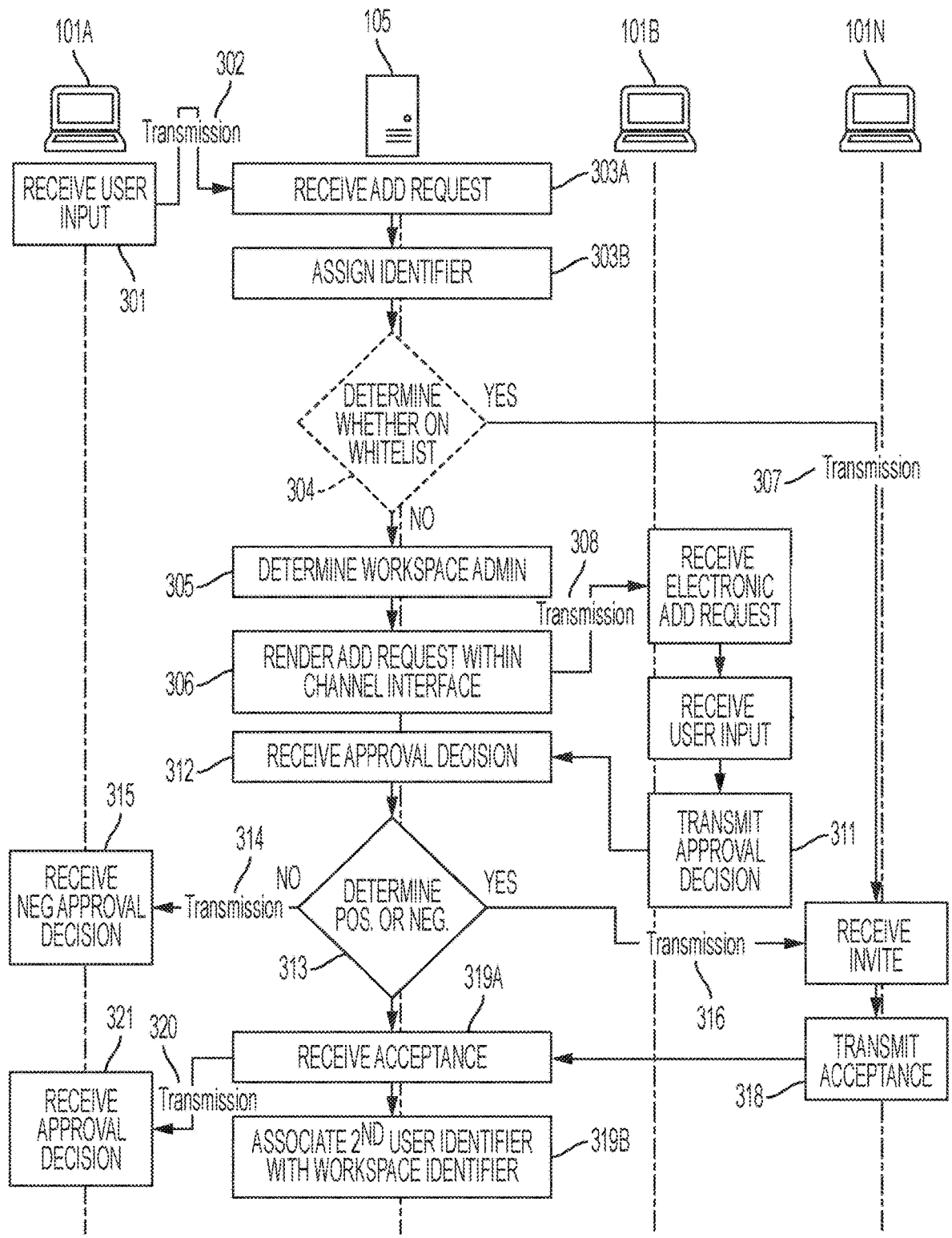

FIG. 3 shows an example data flow attributable to servicing a group-based communication workspace add request according to one embodiment.

Figure 4:
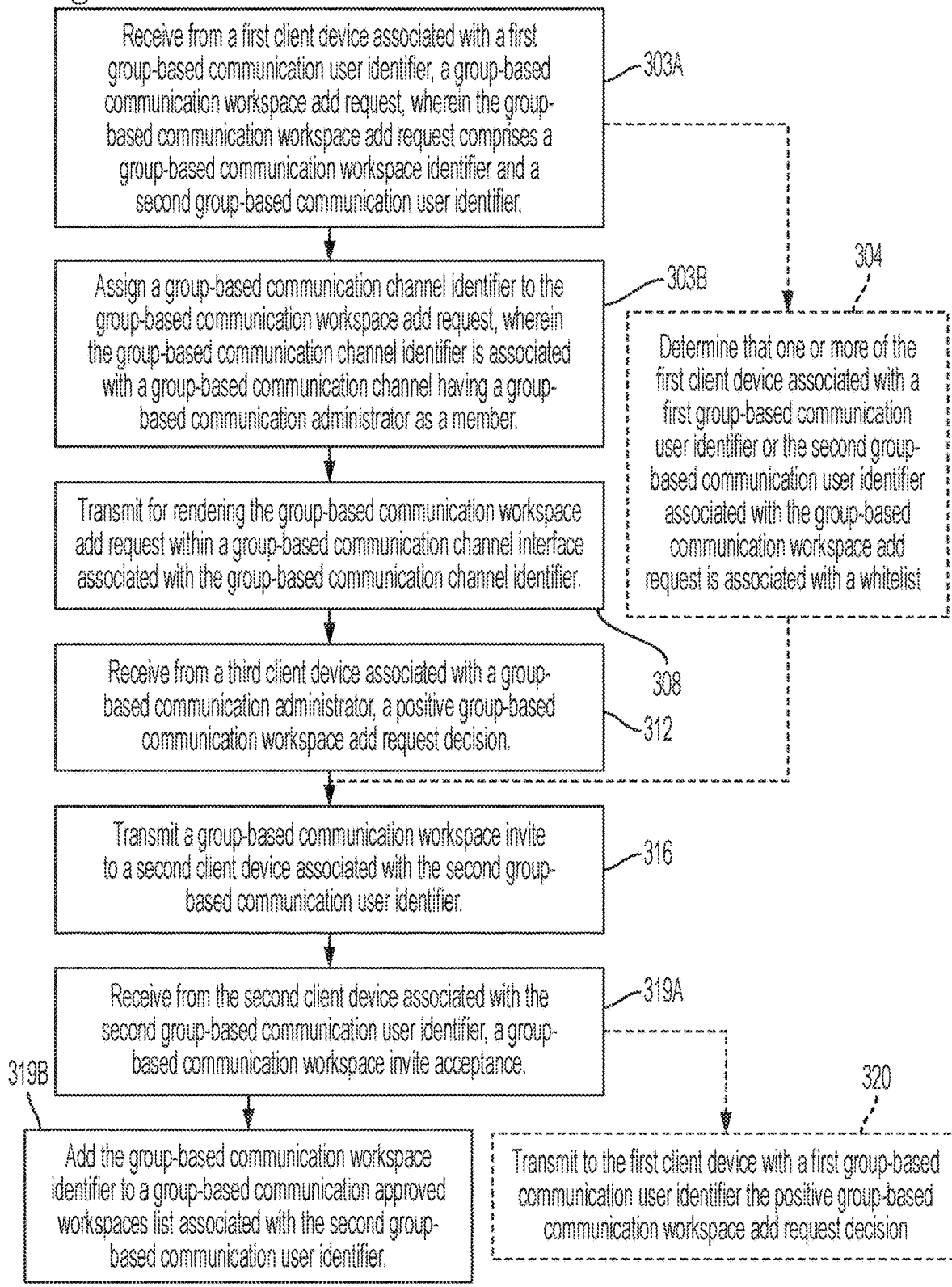

FIG. 4 is a flowchart illustrating operations that are executed by an example group-based communication server for servicing group-based communication workspace add request within a group-based communication system.

Figure 5:
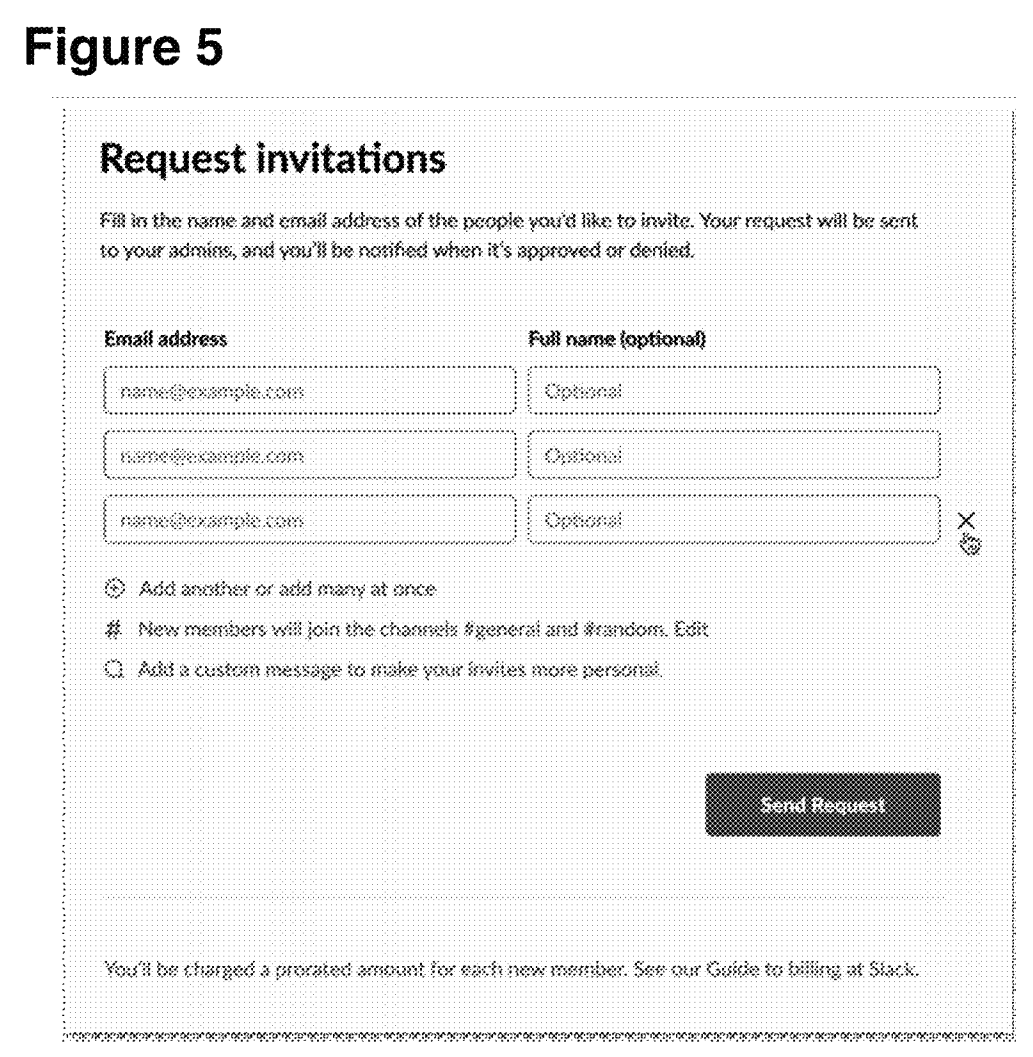

FIG. 5 illustrates an example group-based communication interface according to one embodiment of the present disclosure illustrating a group-based communication workspace add request input screen wherein a first client device associated with a first user identifier may transmit a group-based communication workspace add request to a client device associated with a workspace administrator.

Figure 6:
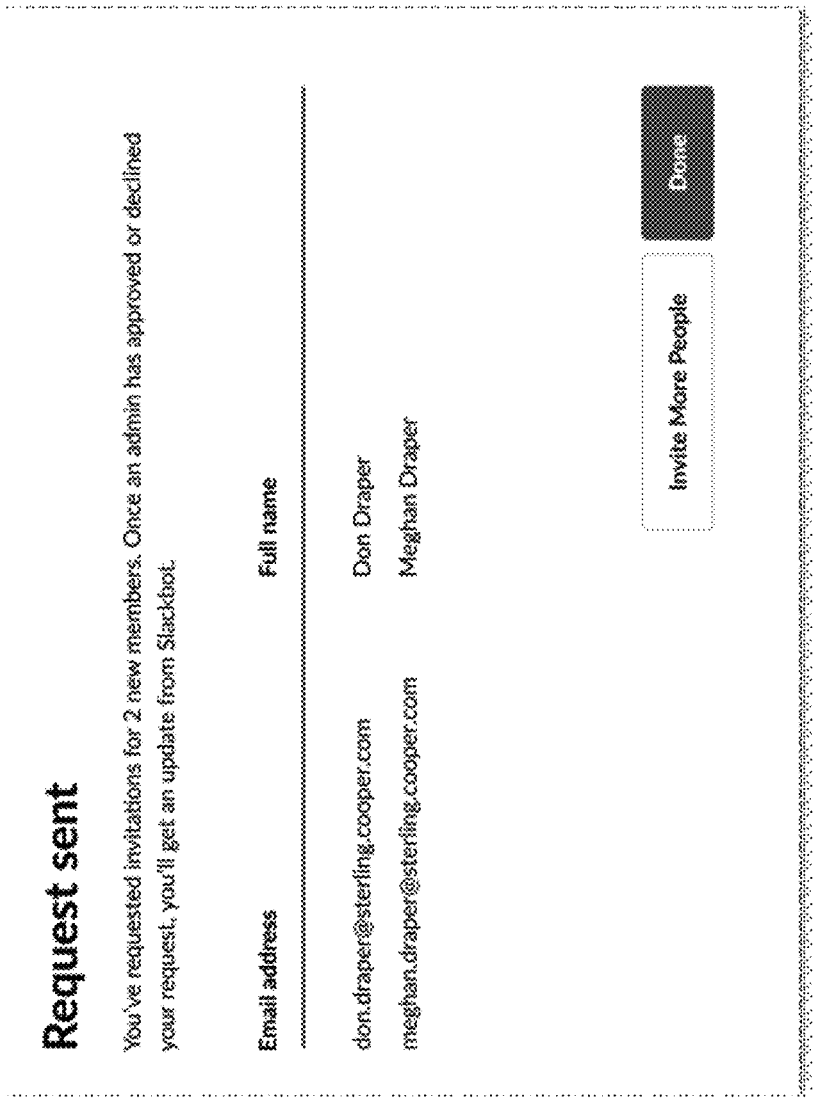

FIG. 6 illustrates an example group-based communication interface according to one embodiment of the present disclosure illustrating a response message from the group-based communication system after the group-based communication workspace add request has been received by the group-based communication system.

Figure 7A:
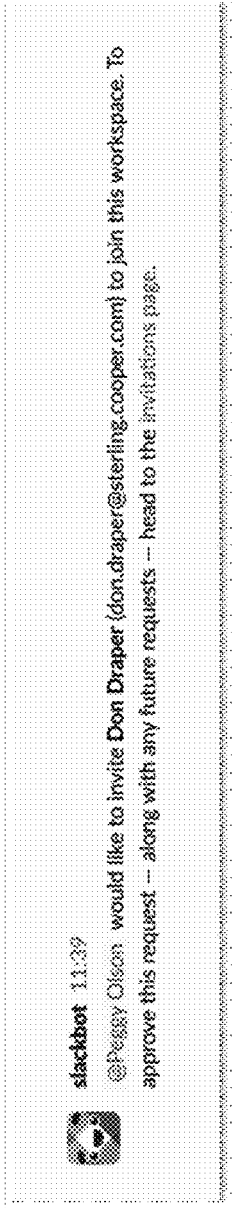
Figure 7B:
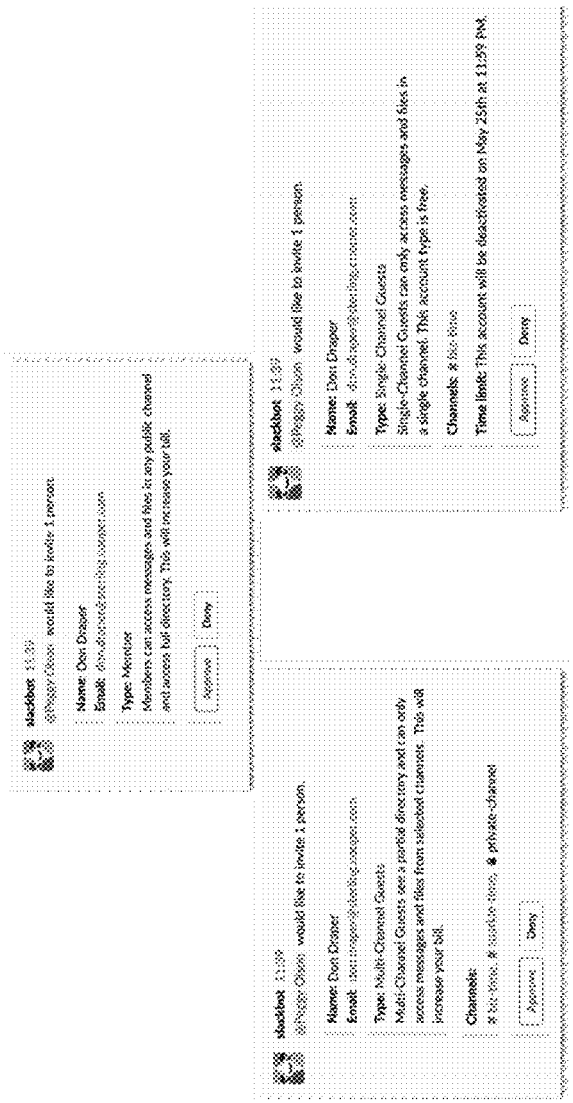

FIGS. 7A and 7B illustrate an example group-based communication interface according to one embodiment of the present disclosure illustrating messages from the group-based communication system to a client device associated with a workspace administrator about a new group-based communication workspace add request.

Figure 8:
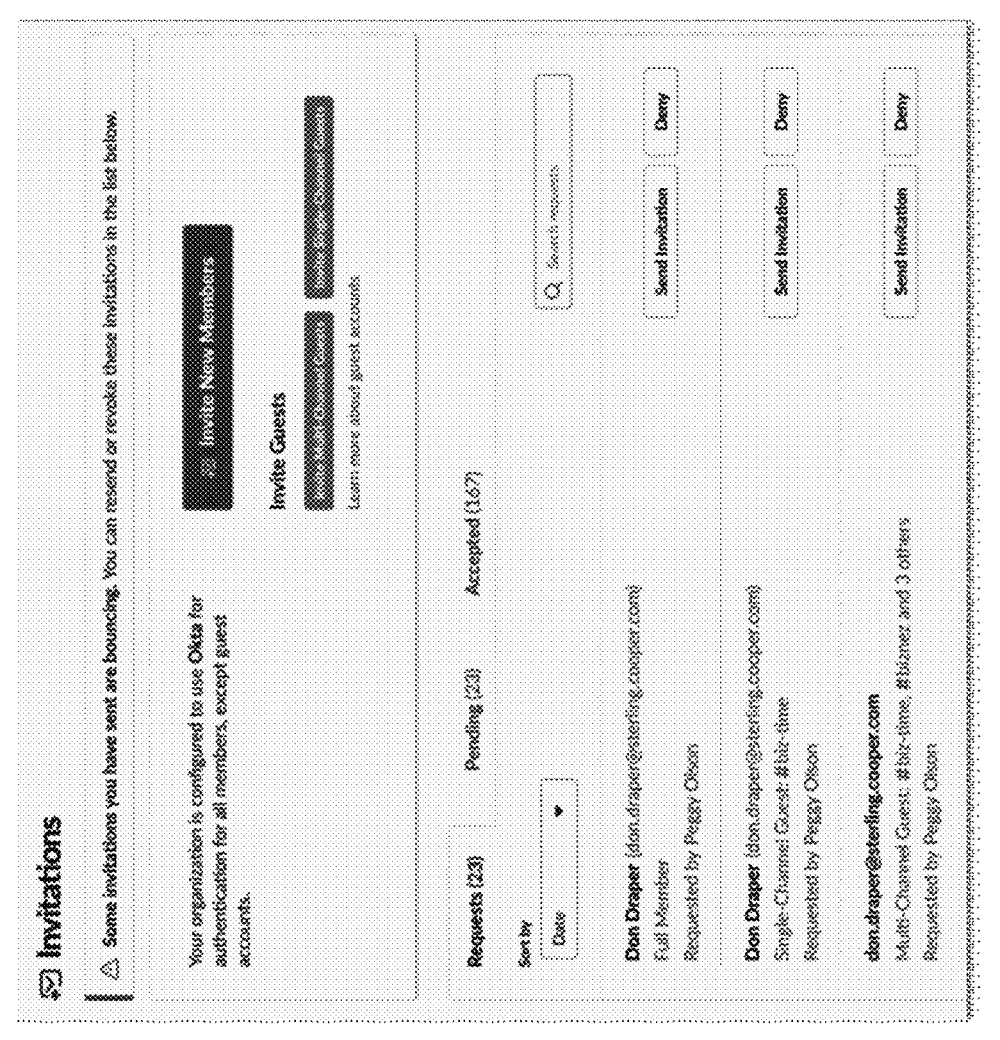

FIG. 8 illustrates an example group-based communication interface according to one embodiment of the present disclosure illustrating a page accessible by a client device associated with a workspace administrator showing group-based communication workspace add requests.

FIG. 9 illustrates an example group-based communication interface according to one embodiment of the present disclosure illustrating a page accessible by a client device associated with a workspace administrator that displays pending invites.

Figure 10:
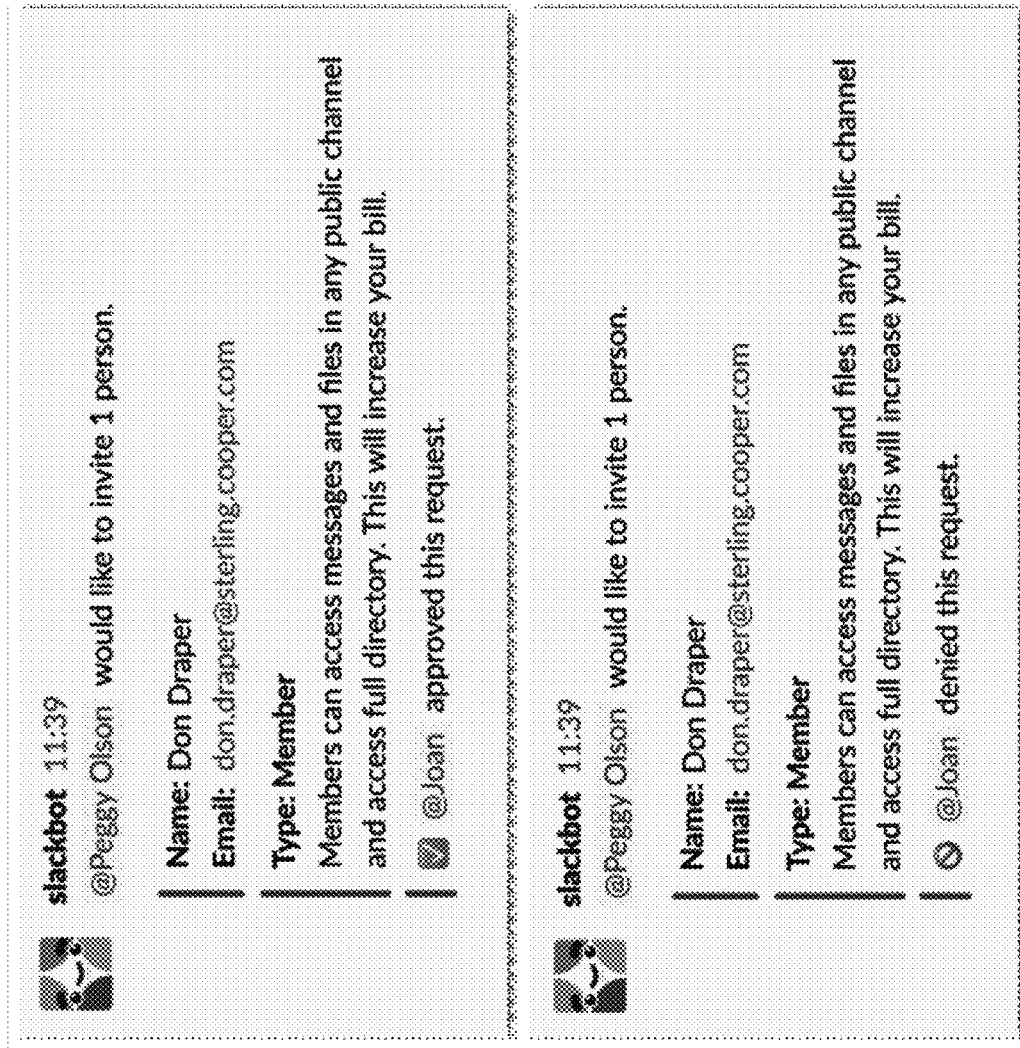

FIG. 10 illustrates an example group-based communication interface according to one embodiment of the present disclosure illustrating a message rendered within a group-based communication channel interface associated with group-based communication channel identifier for workspace administrators.

Figure 11:
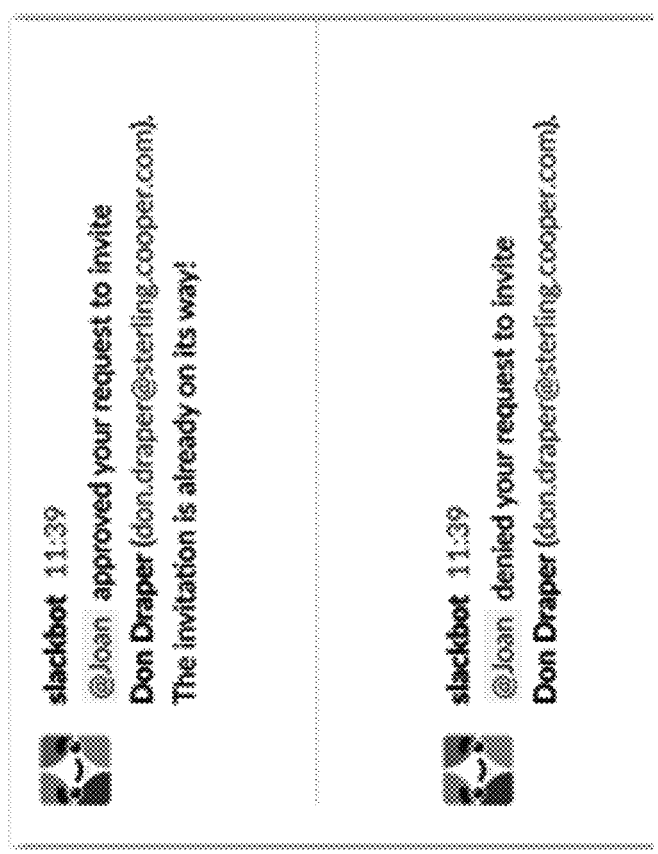

FIG. 11 illustrates an example group-based communication interface according to one embodiment of the present disclosure illustrating a message about the approval decision transmitted from the group-based communication system to the first client device associated with a first user identifier that initiated the group-based communication workspace add request.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the present disclosure are directed to servicing a group-based communication workspace add request within a group-based communication system, the group-based communication system comprising a plurality of group-based communication channels organized among a plurality of group-based communication workspaces. The group-based communication system may include, or be in communication with, among other components, a group-based communication server, a group-based communication repository, one or more validated external resources, and/or one or more client devices.

Many enterprise group-based communication systems or environments restrict inviting new users to a group-based communication workspace to workspace administrators only. However, the inventors of this present disclosure have identified that challenges exist with such restrictions, especially in the case of enterprise group-based communication systems or environments where the workspace administrator may not readily ascertainable.

The inventors have determined that the embodiments of the present disclosure enable any group-based communication workspace member to submit a group-based communication workspace add request directly to the group-based communication system. This allows the workspace administrator to retain ultimate control over access and billing while streamlining the group-based communication workspace add request process.

Moreover, by allowing workspace members to directly provide the group-based communication workspace add request to the group-based communication system, faster processing time is achieved for transmitting group-based communication workspace invites. Further, increased accuracy with respect to invites is achieved because the identification and contact information for the new user is provided to the system directly by the requestor (e.g., rather than emailing the administrator who might then have to manually enter in the identifying and/or contact information of the new user in order to generate a group-based communication workspace invite). This also eliminates the need for workspace members to have knowledge of who the workspace administrator is, which, as discussed above, may be difficult to ascertain and time consuming.

Furthermore, by associating the group-based communication workspace add request with a workspace channel accessible by multiple workspace administrators, multiple workspace administrators are able service the group-based communication workspace add requests, thereby reducing the workload for any one workspace administrator. There is also no need for the workspace administrator to go to a separate application or administrative website to approve the group-based communication workspace add requests since they are accessible within the group-based communication system.

Additionally, the embodiments of the present disclosure allow for further streamlining of group-based communication workspace add requests by utilizing whitelists which can be referenced and lead to automatically transmitting group-based communication workspace invites without the need for input from a device associated with a workspace administrator (i.e., if the user identifiers associated with the group-based communication workspace add request appear on a whitelist, the group-based communication system can automatically transmit a group-based communication workspace invite to the new user). This saves both computing time and system resources. This enables group-based communication workspace invites to be sent out faster and thereby allows new users to join workspaces faster, and this reduces the number of group-based communication workspace add requests a workspace administrator needs to review and approve. The present disclosure also prevents duplicate group-based communication workspace add requests from being reviewed by the administrator and prevents duplicate group-based communication workspace invites from being sent out which saves computing time, system resources, workspace administrator time, and avoids the confusion of duplicate group-based communication workspace add requests and invites.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like. Client devices may be associated with a user. The association may be created by the client device transmitting registration information for user to the group-based communication server. In some instances, a client device may be temporarily associated with a user (e.g., only when a user is logged onto the group-based communication system app).

Client devices configured in accordance with embodiments herein described are configured to generate geographic location data and/or contextual location data. The term "geographic location data" refers to location data (e.g., latitude and longitude coordinates) that is generated by a global positioning system (GPS) receiver housed within the client device. The GPS receiver receives clock data transmitted by one or more geostationary satellites (a satellite in a known or knowable position) and/or one or more ground based transmitters (also in known or knowable positions), compares the received clock data, and computes the geographic location data, which represents a near real-time position for the client device. The term "contextual location data" refers to position or location information that is derived by the client device (or by separate server) based on interactions between the client device and local networks, objects, or devices. Example contextual location data could be derived based on reference to known locations for Wi-Fi routers or Bluetooth devices that are configured to communicate with a client device. A client device may also generate contextual location information based on communicating with radio-frequency identification (RFID) readers or tags, or barcode readers or tags, where such readers or tags have known positions.

"Group-based" is used herein to refer to a system, channel, message, or virtual environment that has security sufficient such that the system, channel, message, or virtual environment is accessible only to a defined group of users (e.g., users having a common group identifier associated with their respective user profiles). The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise supporting servers and client devices, and are further configured to engage external email resources and validated external resources as defined below.

The term "group-based communication server" refers to a software platform and associated hardware that is configured to manage access to the various group-based communication interfaces (defined below) of the group-based communication system. The group-based communication server is configured to access, maintain, and support application product logic of the group-based communication system and to access one or more data repositories such as a group-based communication repository.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface comprises a plurality of group-based communication channels (e.g., a marketing channel, sales channel, accounting channel, etc.), which are defined below.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like. Users referred to herein are discussed largely in connection with client device enabled activity for accessing a group-based communication interface (or set of group-based communication interfaces) of a group-based communication system.

The terms "user profile," "user account," and "user account details" refer to data, files, and other information associated with a user, including, for example, a user identifier, one or more group-based communication channel identifiers (defined below) associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, a graphical representation, an email address, a real name (e.g., John Doe), a username (e.g., j doe), a password, a time zone, an external resource user identifier, avatar rendering settings, and the like. The user account details can include a subset designation of user credentials, such as, for example, login information for the user including the user's username and password.

The terms "group-based communication channel identifier" or "channel identifier" refer to one or more items of data by which a group-based communication channel may be uniquely identified by a group-based communication system. For example, a group-based communication channel identifier may comprise American Standard Code for Information Interchange (ASCII) text, a pointer, a memory address, and the like.

The terms "group identifier" or "team identifier" refer to one or more items of data by which a group-based communication interface within a group-based communication system may be uniquely identified. For example, a group identifier may comprise ASCII text, a pointer, a memory address, and the like. In one embodiment, the group identifier associated with member users of a Slack Corporation workspace (i.e., a group-based communication interface) is 104356721.

Group-based communication system users are organized into organization groups (e.g., employees of each company may be a separate organization group) and each organization group may have one or more group-based communication channels to which users may be assigned or which the users may join (e.g., group-based communication channels may represent departments, geographic locations such as offices, product lines, user interests, topics, issues, and/or the like). A group identifier is used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "validated external resource" refers to a software program, application, platform, or service that is configured to communicate with the group-based communication system for providing an external, non-email service (i.e., not native to the group-based communication system) to a client device via a group-based communication interface. The validated external resource operates on a compiled code base or repository that is separate and distinct from that which supports the group-based communication system. In some embodiments, the validated external resource may communicate with the group-based communication system, and vice versa, through one or more application program interfaces (APIs). In some embodiments, the validated external resource receives tokens or other authentication credentials that are used to facilitate secure communication between the validated external resource and the group-based communication system in view of group-based communication system network security layers or protocols (e.g., network firewall protocols).

The term "validated user data object" refers to structured or templatized data that is generated by and transmitted from a validated external resource to a group-based communication system. The validated user data object documents past, present, or future engagement of a user with the validated external resource and, thus, may be parsed by the group-based communication system to determine a user status at given time and an associated user status avatar. Example validated user data objects include: a user profile of the validated external resource, a user calendar object of the validated external resource, an operational workflow of the validated external resource, project management data of the validated external resource, project scheduling data of the validated external resource, client device location data captured by the validated external resource, finance management data of the validated external resource, office management data of the validated external resource, and the like.

The term "external email resource" refers to a software program, application, platform, or service that is configured to provide electronic mail ("email") services to users operating client devices. The external email resource comprises an email client, a simple mail transfer protocol ("SMTP") server, and a domain name server ("DNS"). The external email resource is configured to allow a sending user ("a sender") to create and transmit an email message to a receiving user ("a recipient"). Each email message comprises an email envelope that defines its electronic format, an email header that comprises sender/recipient information and an email subject line, and an email body that comprises text, images, and file attachments. The external email resource operates on a compiled code base or repository that is separate and distinct from that which supports the group-based communication system. Example external email resources include Office 365® and Gmail®.

An email client of the external email resource may be used by a sender to create and transmit an email message. The email message text and attachments are thus uploaded to the SMTP server as outgoing mail. A copy of the email message is stored to an email outbox associated with the sender for later retrieval. The SMTP server communicates with the DNS to find a recipient email server using recipient information drawn from the email header. Once the SMTP server finds the recipient email server, it transfers the email message to the recipient email server. The next time the recipient accesses the email client, the email client downloads the email message from the recipient email server for presentation to the recipient in an email inbox interface.

The external email resource may also include programs, applications, platforms, or services configured to provide services related to providing email services. For example, external email resources configured in accordance with embodiments herein described include calendar and scheduling services. Such calendar and scheduling services are configured to provide one or more files containing one or more user data objects to the group-based communication system. For example, the group-based communication system may subscribe to an application program interface (API) of the external email resource that is configured to transmit one or more user data objects as defined below.

The term "single-user external email corpus" refers to a file object containing all email messages and user account information that is necessary for an external email resource to reconstruct an email account (including all associated calendar and scheduling services) associated with a single user. The single-user external email corpus may include email attachments, such as calendar invitations, received and sent by a user. The single-user external email corpus may be stored in a personal storage table (".pst") format. Some or all of the single-user external email corpus, such as the calendar and scheduling services, may be stored in an iCalendar (".ics") format or a vCalendar (".vcs") format.

The term "multi-user external email corpus" refers to a file object containing all email messages and user account information that is necessary for an external email resource to reconstruct email accounts (including all associated calendar and scheduling services) associated with multiple enterprise users. For example, an enterprise administrator may use a multi-user external email corpus to rebuild email accounts for employees of ACME Corporation. The multi-user external email corpus may include email attachments, such as calendar invitations, received and sent by the multiple user. The multi-user external email corpus may be stored in .pst format. Some or all of the multi-user external email corpus, such as the calendar and scheduling services, may be stored in an iCalendar (".ics") format or a vCalendar (".vcs") format.

The term "user data object" refers to structured or templatized data that is generated by and transmitted from an external email resource to a group-based communication system. The user data object documents past, present, or future engagement of a user with the external email resource in the form of email resource engagement data. Once email resource data has been extracted, parsed, or otherwise identified from one or more user data objects, it may be used by the group-based communication system to determine a user status at given time and an associated user status avatar. Example user data objects include a user profile of the external email resource, a user calendar object of the external email resource, a single-user external email corpus of the external email resource, a multi-user external email corpus of the external email resource, or the like.

The term "external resource" refers to a software program, application, platform, or service that is configured to communicate with the group-based communication system for providing an external service (i.e., not native to the group-based communication system) to a client device via a group-based communication interface. More particularly, in some embodiments, an external resource may be either an external email resource, or a validated external email resource as described above.

The term "user status data object" refers to structured or templatized data that is generated by and transmitted from an external resource to a group-based communication system. The user status data object may be either a user data object or a validated user data object, as discussed above, based on the type of external resource. The user status data object documents past, present, or future engagement of a user with the external resource in the form of external engagement data. External engagement data may be either email resource engagement data or validated resource engagement data. Once external resource data has been extracted, parsed, or otherwise identified from one or more user status data objects, it may be used by the group-based communication system to determine a user status at a given time and an associated user status avatar. The group-based communication server may be configured to process the user status data object differently based whether the user status data object is a user data object or a validated user data object.

The term "external resource user identifier" refers to one or more items of data by which a user (or user profile) of a validated external resource or an external email resource may be uniquely identified by a group-based communication system. For example, an external resource user identifier may comprise American Standard Code for Information Interchange (ASCII) text, a pointer, a memory address, and the like. One or more external resource user identifiers may be stored to a user profile of a group-based communication system along with other identifiers (e.g., user identifier, group identifiers, group-based communication channel identifiers, etc.). The external resource user identifier may be embodied in a format native to the validated external resource or the external email resource to which it is associated or may be structured in a format designated by the group-based communication system. Correlating one or more external resource user identifiers to a user account or user identifier of the group-based communication system allows the group-based communication system to link accounts from disparate validated external resources or external email resources with a selected group-based communication system user account. The external resource user identifier also may include information relating to the source of the external resource (e.g., the external resource user identifier may be used to identify both the user associated with the user status data object and whether the user status data object was provided by an external email resource or a validated external resource. In some embodiments, the external resource user identifier may be defined by the external resource. The external resource user identifier may include an integer identifier, a universally unique identifier, an email address, a random string, and/or the like. In such a case, the group-based communication server may receive the external resource user identifier during the open authorization (OAuth) process.

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "enterprise group-based communication system" refers to a networked electronic communications environment comprising a group-based communication repository and a group-based communication server that is configured to enable group-based collaborative communication between members of an enterprise. In some embodiments, the enterprise group-based communication system may be operated and instituted by a third-party. The enterprise group-based communication system has increased requirement for availability, scalability, performance, compatibility and security over non-enterprise networks (e.g., a home internet network) and may span multiple enterprises and allow cross collaboration between not only members of different groups within an enterprise or organization, but also collaboration between members and teams of multiple organizations or enterprises.

The term "enterprise" should be understood to refer to a company, organization and the like. These terms are used interchangeably throughout the disclosure.

The term "access rights" refers to parameters for controlling the ability of users to view, change, navigate, and execute contents of the group-based communication system.

The term "whitelist" should be understood to refer to access control parameters that indicate to a group-based communication server one or more members of a group-based communication system allowed to take an action (e.g., joining a channel or group). The members may be identified by one or more identifiers such as a global identifier, user identifier, and/or group identifier. In one embodiment, if the group-based communication system receives a group-based communication workspace add request associated with a first and second user identifier and the first or second user identifier appears on a whitelist, then group-based communication system transmits a group-based communication workspace invite to the client device associated with the second user identifier without input from a client device associated with a group-based communication administrator.

The term "blacklist" should be understood to refer to access control parameters that indicate to a group-based communication server one or more members of a group-based communication system that are restricted from taking an action (e.g., joining a channel or group). The members may be identified by one or more identifiers such as a global identifier, user identifier, and/or group identifier. In one embodiment, if the group-based communication system receives a group-based communication workspace add request associated with a first and second user identifier and the first or second user identifier appears on a blacklist, then the group-based communication system transmits an indication of the negative group-based communication workspace add request approval decision to the client device associated with the first user identifier without input from a client device associated with a group-based communication administrator.

The term "viewing interface" refers to a virtual communications environment, feed, and/or display configured to display work objects exchanged via a communication platform. For example, a viewing interface may be embodied as and/or accessible via an email client (e.g., Gmail, Microsoft Outlook, Hotmail, and/or the like). As another example, a viewing interface may be an electronic calendar (e.g., Google Calendar, iCal, Microsoft Outlook, and/or the like).

As a specific example, a viewing interface may be embodied as a "group-based communication channel interface" or "communication channel interface," which refers to a virtual communications environment or feed accessible to users of the group-based communication platform that is configured to display messaging communications (and/or other work objects) posted/shared/transmitted by channel members (e.g., validated users accessing the environment using client devices) that are viewable only to the members of the group. The format of the communication channel interface may appear differently to different members of the group-based communication channel; however, the content of the communication channel interface (i.e., messaging communications) will be displayed to each member of the group-based communication channel. For instance, a common set of group-based messaging communications will be displayed to each member of the respective group-based communication channel such that the content of the communication channel interface (i.e., messaging communications) will not vary per member of the group-based communication channel.

As used herein, the terms "messaging communication" and "message" refer to any electronically generated work object provided by a user using a client device and that is configured for display within a communication channel interface. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a communication channel (e.g., a group-based communication channel) of the group-based communication platform includes metadata comprising the following: a sending user identifier, a message identifier, message contents, an object identifier, a group identifier and/or a communication channel identifier. Each of the foregoing identifiers may comprise ASCII text, a pointer, a memory address, and the like.

The term "group-based communication workspace add request" refers to an electronic request transmitted by a client device associated with a first user identifier to a group-based communication server, where the request is for access rights to a first workspace to be granted to a second user identifier. In embodiments, the request is for access rights to a first group-based communication channel within a first group-based communication workspace to be granted to a client device associated with second user identifier who is not a member of the first group-based communication workspace. In embodiments, the request is for access rights to a group-based communication channel within a first group-based communication workspace within a first organization, where the group-based communication channel is shared with a second group-based communication workspace within a second organization (i.e., a shared channel). In such embodiments, a client device associated with the first user identifier who submits the request is associated with the first group-based communication workspace and a client device associated with the second user identifier is associated with the second organization.

The term "group-based communication workspace" refers to a virtual communications environment with restricted access such that it is not generally accessible and/or searchable by other members of the group-based communication system. Administrators may add users to a group-based communication workspace.

The term "group-based communication user identifier" refers to one or more items of data by which a user (or user profile) may be uniquely identified by a group-based communication system.

The term "group-based communication administrator" refers to credentials or identifiers associated with a user profile that indicate to a group-based communication server that a client device associated with the user profile may edit access control parameters (e.g., grant access to a new user) of a workspace. Users identified as administrators may edit the access control rights to a group-based communication workspace. Administrators may also add users to a group-based communication workspace.

The term "group-based communication workspace add request approval decision" refers to an electronic transmission by a client device associated with a user profile identified as an administrator (i.e., an administrator's client device) representing a positive (i.e., affirmation) or negative (i.e., decline) decision for whether to add a workspace identifier to a list of workspace identifiers a second user profile may access. In one embodiment, the group-based communication workspace add request approval decision is positive and the workspace identifier is added to the list of workspace identifiers the second user profile may access. Additionally, an indication of the positive group-based communication workspace add request approval decision may be transmitted to the client device associated with the first user identifier. In another embodiment, the group-based communication workspace add request approval decision is negative and an indication of the negative group-based communication workspace add request approval decision is transmitted to the client device associated with the first user identifier.

The term "group-based communication workspace invite" refers to a message transmitted by the group-based communication system to a client device associated with a user identifier, the group-based communication workspace invite representing an invitation to join a workspace associated with a workspace identifier with which the user identifier has not previously been associated. In one embodiment, the invite is transmitted to the client device via an external resource, such as email. In one embodiment, the invite is transmitted to the client device via the group-based communication interface.

The term "group-based communication workspace invite acceptance" refers to a response transmitted from a client device associated with a user identifier to a group-based communication system representing an acceptance by the client device associated with the user identifier of a group-based communication workspace invite.

The term "group-based communication approved workspaces list" refers to a data structure comprising one or more workspace identifiers and a user identifier such that the workspace identifiers identify workspaces within a group-based communication system that the user identifier is allowed to access.

The term "group-based communication workspace add request batch" refers to two or more group-based communication workspace add requests. In one embodiment, the two or more requests are compared to each other and also compared to a table of pending add requests and group-based communication workspace invites such that any duplicate requests are deleted from or ignored by the group-based communication system.

The term "pre-access requirements" refers to any documentation (e.g., a non-disclosure agreement) that is required to be completed by a client device associated with a user identifier before access rights to a workspace for the client device associated with the user identifier is granted.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example group-based communication system 105 within which embodiments of the present disclosure may operate. Users may access a group-based communication system 105 via a communication network 104 using client devices 101A-101N. The group-based communication system 105 may comprise a group-based communication server 106 in communication with at least one group-based communication repository 107. Client devices 101A-101N may interact peer-to-peer or may interact with the group-based communication server 106 or group-based communication repository 107 through the communication network 104.

Communication network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 104 may include a cellular telephone, a 902.11, 902.16, 902.20, and/or WiMax network. Further, the communication network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers as configured herein. The group-based communication server 106 may provide for receiving of electronic data from various sources, including but not necessarily limited to the client devices 101A-101N. For example, the group-based communication server 106 may be operable to receive and post or transmit user activity data logs, user data objects, validated user data objects, requests, invitations, communications, external resource user identifiers, user profiles, and the like provided by the client devices 101A-101N and/or the validated external resources 120. The group-based communication server 106 may be configured to service a group-based communication workspace add request within a group-based communication system. In some embodiments, the group-based communication server 106 may be in communication with the group-based communication repository 107 through the communication network 104 or otherwise.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an example group-based communication system 105, requests, invitations, communications, identifiers, and the like may be sent from a client device 101A-101N to a group-based communication system 105. In various implementations, the requests, invitations, communications, user identifiers, external resource user identifiers, and the like may be sent to the group-based communication system 105 over communication network 104 directly by a client device 101A-101N, the requests, invitations, communications, identifiers, and the like may be sent to the group-based communication system 105 via an intermediary such as an intermediate server or another client device 101A-101N, and/or the like. For example, the client device 101A-101N may be a desktop, a laptop, a tablet, a smartphone, and/or the like that is executing a client application (e.g., a group-based communication app). In one implementation, the requests, invitations, communications, identifiers, and the like may include data such as a user identifier, a group identifier, a group-based communication channel identifier, an external resource user identifier, attachments (e.g., files), profile data, group-based communication interface data, email resource engagement data, validated resource engagement data, user activity data log(s), group-based communication channel data, messaging communication data, third party metadata, location data, and/or the like. Additionally, the data may be provided by the validated external resource(s) 120.

In some embodiments of the present disclosure, the group-based communication system 105 may be connected to, or in communication with, at least one validated external resource 120. The group-based communication system 105, such as the group-based communication server 106, may be in communication with the at least one validated external resource 120 through the communication network 104.

In some embodiments, the group-based communication system 105 may be configured to include or be in communication with a group-based communication repository 107. The group-based communication repository 107 may include identification data for one or more users. In some embodiments, the group-based communication repository 107 may include external resource user identifiers, user identifiers, channel identifiers, group identifiers, and the like, that are associated with one or more users.

In some embodiments of an exemplary group-based communication system 105, a message or messaging communication may be sent from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., an enterprise group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertificate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only one to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
```

```
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
        </client_details>
        <message>
            <message_identifier>ID_message_10</message_identifier>
            <team_identifier>ID_team_1</team_identifier>
            <channel_identifier>ID_channel_1</channel_identifier>
            <contents>That is an interesting invention. I have attached a copy our patent
    policy.</contents>
            <attachments>patent_policy.pdf</attachments>
        </message>
</auth_request>
```

The group-based communication system 105 comprises at least one group-based communication server 106 that may create a storage message based upon the received message to facilitate message indexing and storage in group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a

```
POST /storage_message.php HTTP/1.1
Host: www.server.com
Content-Type: Application/XML
Content-Length: 667
<?XML version = "1.0" encoding = "UTF-8"?>
<storage_message>
        <message_identifier>ID_message_10</message_identifier>
        <team_identifier>ID_team_1</team_identifier>
        <channel_identifier>ID_channel_1</channel_identifier>
        <sending_user_identifier>ID_user_1</sending_user_identifier>
        <topics>
            <topic>inventions</topic>
            <topic>patents</topic>
            <topic>policies</topic>
        </topics>
        <responses>
            <response>liked by ID_user_2</response>
            <response>starred by ID_user_3</response>
        </responses>
        <contents>That is an interesting invention. I have attached a copy our patent
    policy.</contents>
        <attachments>patent_policy.pdf</attachments>
        <conversation_primitive>
            conversation includes messages: ID_message_8, ID_message_9, ID_message_10,
                ID_message_11, ID_message_12
        </conversation_primitive>
</storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP commands) to determine a sending user identifier of the user who sent the message.

hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:
SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the enterprise group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatuses for Implementing Embodiments of the Present Disclosure

The group-based communication system 105 may be embodied by one or more computing systems, such as apparatus 200 shown in FIG. 2. The apparatus 200 may include a processor 202, a memory 201, input/output circuitry 203, group-based communication circuitry 204, and communications circuitry 205. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system 105. The group-based communication circuitry 204 may utilize processing circuitry, such as the processor 202, to perform these actions. The group-based communication circuitry 204 may send and/or receive data from group-based communication repository 107. In some implementations, the sent and/or received data may be of digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

Example Group-Based Communication Workspace Add Request Servicing Operations

Messages are generated by and received from client devices 101A-101N interacting directly with the group-based communication system 105. Referring now to FIG. 3, various processes performed by various computing entities discussed herein are illustrated with respect to servicing group-based communication workspace add requests within a group-based communication system. FIG. 4 illustrates operations that are executed by an example embodiment of the group-based communication server for servicing a group-based communication workspace add request within a group-based communication system.

The group-based communication workspace add request is generated 301 by a first client device 101A. In one embodiment, the request may be generated via a group-based communication interface such as that depicted in FIG. 5.

The group-based communication workspace add request is transmitted 302 to the group-based communication system 105. In one embodiment, the group-based communication system 105 determines 305 the workspace administrator based on the workspace identifier associated with the group-based communication workspace add request and renders 306 the group-based communication workspace add request within a channel interface configured for receiving input from a third client device associated with a group-based communication administrator 101B. In one embodiment, the group-based communication workspace add request is rendered within a channel interface such as that depicted in FIGS. 7A and 7B.

In embodiments, the group-based communication server 106 receives 303A, such as by using the group-based communication circuitry 204, from a first client device associated with a first group-based communication user identifier 101M, a group-based communication workspace add request. In embodiments, the group-based communication workspace add request comprises a group-based communication workspace identifier and a second group-based communication user identifier. In one embodiment, the group-based communication workspace add request comprises a group-based communication workspace identifier and a second group-based communication user identifier. In another embodiment, the group-based communication workspace add request comprises a plurality of group-based communication workspace add requests associated with a common group-based communication user identifier. In embodiments, the plurality of group-based communication workspace add requests are consolidated into a group-based communication workspace add request batch.

In embodiments, the group-based communication server 106 assigns 303B, such as by using the processor 202, a group-based communication channel identifier to the group-based communication workspace add request. In embodiments, the group-based communication channel identifier is associated with a group-based communication channel having a group-based communication administrator as a member.

In embodiments, the group-based communication server 106 optionally determines 304, such as by using the processor 202, that one or more of the first client device associated with a first group-based communication user identifier or the second group-based communication user identifier associated with the group-based communication workspace add request is associated with a whitelist. In one embodiment, the processor 202 retrieves the whitelist from a group-based communication repository 107. If the group-based communication system 105 determines whether one or more of the first client device 101A associated with a first group-based communication user identifier or the second group-based communication user identifier associated with the group-based communication workspace add request is associated with a whitelist, then group-based communication system 105 transmits 307 a group-based communication workspace invite to a second user device associated with a second group-based communication user identifier 101N. The system thereby circumvents the need for input from a third client device associated with a group-based communication administrator 101B.

In another embodiment, the processor 202 determines that one or more of the first client device associated with a first group-based communication user identifier or the second group-based communication user identifier associated with the group-based communication workspace add request is associated with a blacklist.

In embodiments, the group-based communication server 106 renders 306, such as by using the processor 202, the group-based communication workspace add request within a group-based communication channel interface associated with the group-based communication channel identifier. In embodiments, the group-based communication server 106 transmits 308, such as by using the group-based communication circuitry 204, the group-based communication workspace add request to an external validated external resource. In embodiments, the group-based communication server 106 transmits, such as by using the group-based communication circuitry 204, the group-based communication workspace add request to a centralized interface for group-based communication administrators. In embodiments, the pending group-based communication workspace add requests are displayed in the centralized interface which can be accessed by client devices associated with a group-based communication administrators.

In embodiments, the third client device associated with a group-based communication administrator 101B transmits 311 a group-based communication workspace add request approval decision to the group-based communication system 105. In embodiments, the group-based communication workspace add request approval decision is transmitted to the group-based communication system 105 by an external validated external resource.

In embodiments, the group-based communication server 106 receives 312, such as by using the group-based communication circuitry 204, from a third client device associated with a group-based communication administrator, a positive group-based communication workspace add request decision. In another embodiment, the group-based communication workspace add request decision is negative. In embodiments, the group-based communication system 105, determines 313 whether the group-based communication workspace add request approval decision is positive or negative.

If the group-based communication system 105 determines that the group-based communication workspace add request approval decision is positive, the group-based communication system 105 transmits 316 for rendering a group-based communication workspace invite to the second client device. In one embodiment, the group-based communication workspace invite is transmitted to the second client device via an external resource such as email. In one embodiment, the group-based communication workspace invite is transmitted for rendering in the group-based communication interface for the second client device.

If the group-based communication system 105 determines that the group-based communication workspace add request approval decision is negative, the group-based communication system 105 transmits 314 the negative group-based communication workspace add request approval decision 315 to the first client device 101A which originated the group-based communication workspace add request. In one embodiment, the negative group-based communication workspace add request approval decision is rendered within a channel interface. In one embodiment, the negative group-based communication workspace add request approval decision is rendered within an electronic (non-human) user within a channel interface such as that depicted in FIG. 11. In embodiments, the group-based communication system 105 transmits 314 the negative group-based communication workspace add request approval decision to the first client device 101A which originated the group-based communication workspace add request along with a message from a third client device associated with a group-based communication administrator indicating the reason for the denial. In embodiments, the first client device 101A which originated the group-based communication workspace add request is able to transmit a request for re-review to the group-based communication system 105 upon receiving the negative group-based communication workspace add request approval decision from the group-based communication system 105.

In one embodiment, the group-based communication workspace invite comprises a redirect to a validated external resource for completion of pre-access requirements. In embodiments, the pre-access requirements are completed prior to adding the group-based communication workspace identifier to the group-based communication approved workspaces list for the second group-based communication user as discussed below. In one embodiment, the external validated external resource communicates with the group-based communication system 105 upon completion of pre-access requirement by the second client device associated with the second group-based communication user identifier.

In embodiments, the group-based communication server 106 receives 319A, such as by using the group-based communication circuitry 204, from the second client device associated with the second group-based communication user identifier, a group-based communication workspace invite acceptance 318.

In embodiments, the group-based communication server 106 adds 319B, such as by using the processor 202, the group-based communication workspace identifier to a group-based communication approved workspaces list associated with the second group-based communication user identifier. In one embodiment, the workspace list associated with a group-based communication user identifier is stored in a group-based communication repository 107. In embodiments, the group-based communication server 106 removes the group-based communication workspace communication workspace identifier from a group-based communication approved workspaces list associated with the second group-based communication user identifier after a defined period of time.

In embodiments, the group-based communication server 106 optionally transmits 320 for rendering, such as by using the group-based communication circuitry 204, to the first client device with a first group-based communication user identifier the positive group-based communication workspace add request decision 321.

Example Group-Based Communication Interfaces

Referring now to FIG. 5, an example group-based communication interface is provided illustrating a user input interface for transmitting workspace add requests from a first client device to a client device associated with a group-based communication administrator.

Referring now to FIG. 6, an example group-based communication interface is provided illustrating a response message from the group-based communication system to the first client device transmitting a group-based communication workspace add request after the group-based communication workspace add request has been received by the group-based communication system 105.

Referring now to FIGS. 7A and 7B, example group-based communication interfaces are provided illustrating messages from the group-based communication system to a client device associated with a workspace administrator about a new group-based communication workspace add request. In FIG. 7A, a client device associated with a workspace administrator is redirected to an invitation page (See FIG. 8) where the client device associated with a workspace administrator transmits a positive or negative approval decision. In FIG. 7B, the client device associated with a workspace administrator can transmit a positive or negative approval decision directly from the message.

Referring now to FIG. 8, an example group-based communication interface is provided illustrating a page accessible by a client device associated with a workspace administrator showing group-based communication workspace add requests. Likewise, FIG. 9 provides an example group-based communication interface illustrating a page accessible by a client device associated with a workspace administrator showing pending group-based communication workspace invites.

FIG. 10 illustrates an example group-based communication interface illustrating a message rendered within a group-based communication channel interface associated with a group-based communication channel identifier for workspace administrators. The message serves to notify all users with access to the group-based communication channel for workspace administrators that an administrator has approved or denied a group-based communication workspace add request.

Referring now to FIG. 11, an example group-based communication interface is provided illustrating a message about the approval decision transmitted from the group-based communication system 105 to the client device that initiated the group-based communication workspace add request. The top panel shows a message for a positive approval decision. The bottom panel shows a message for a negative approval decision.

CONCLUSION

Many modifications and other embodiments of the inventions set forth herein will come to mind to one skilled in the art to which the inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus configured to service a group-based communication system, the group-based communication system comprising a plurality of group-based communication channels organized among a plurality of group-based communication workspaces, the apparatus comprising at least a processor, and a memory associated with the processor having computer coded instructions therein, with the computer coded instructions configured to, when executed by the processor, cause the apparatus to:

receive, from a first client device associated with a first group-based communication user identifier, a group-based communication workspace add request, wherein the group-based communication workspace add request comprises a group-based communication workspace identifier and a second group-based communication user identifier;

assign a group-based communication channel identifier to the group-based communication workspace add request, wherein the group-based communication channel identifier is associated with a group-based communication channel;

render the group-based communication workspace add request within a group-based communication channel interface associated with the group-based communication channel identifier;

in response to receiving, from a third client device associated with at least one group-based communication administrator, a positive group-based communication workspace add request decision, transmit a group-based communication workspace invite to a second client device associated with the second group-based communication user identifier; and in response to receiving, from the second client device associated with the second group-based communication user identifier, a group-based communication workspace invite acceptance, add the group-based communication workspace identifier to a group-based communication approved workspaces list associated with the second group-based communication user identifier.

2. The apparatus of claim 1, further configured to, prior to assigning the group-based communication channel identifier to the group-based communication workspace add request, upon determining that one or more of the first client device associated with the first group-based communication user identifier or the second group-based communication user identifier associated with the group-based communication workspace add request is associated with a whitelist, automatically transmit the group-based communication workspace invite to the second client device.

3. The apparatus of claim 1, wherein the group-based communication workspace add request comprises a plurality of group-based communication workspace add requests associated with a common group-based communication user identifier, wherein the plurality of group-based communication workspace add requests is consolidated into a group-based communication workspace add request batch, wherein the group-based communication workspace add request batch is assigned the group-based communication channel identifier, and wherein the apparatus is configured to cause to render the group-based communication workspace add request within the group-based communication channel interface associated with the group-based communication channel identifier.

4. The apparatus of claim 1, wherein the group-based communication workspace invite comprises a redirect to a validated external resource for completion of pre-access requirements, wherein the pre-access requirements are completed prior to adding the group-based communication workspace identifier to the group-based communication approved workspaces list for the second group-based communication user identifier.

5. The apparatus of claim 1, further configured upon receiving, from the third client device associated with the at least one group-based communication administrator, the positive group-based communication workspace add request decision, transmit to the first client device associated with the first group-based communication user identifier the positive group-based communication workspace add request decision.

6. The apparatus of claim 1, wherein upon receiving from the third client device associated with the at least one group-based communication administrator, a negative group-based communication workspace add request decision, transmit to the first client device associated with the first group-based communication user identifier the negative group-based communication workspace add request decision.

7. The apparatus of claim 1, further configured to, prior to assigning the group-based communication channel identifier to the group-based communication workspace add request, upon determining that one or more of the first client device associated with the first group-based communication user identifier or the second group-based communication user identifier associated with the group-based communication workspace add request is associated with a blacklist, automatically transmit to the first client device associated with the first group-based communication user identifier a negative group-based communication workspace add request decision.

8. A non-transitory computer-readable storage medium, the computer-readable storage medium including instructions that when executed by a computer, cause the computer to:
receive, from a first client device associated with a first group-based communication user identifier, a group-based communication workspace add request, wherein the group-based communication workspace add request comprises a group-based communication workspace identifier and a second group-based communication user identifier;
assign a group-based communication channel identifier to the group-based communication workspace add request, wherein the group-based communication channel identifier is associated with a group-based communication channel;
transmit for rendering the group-based communication workspace add request within a group-based communication channel interface associated with the group-based communication channel identifier;
in response to receiving, from a third client device associated with at least one group-based communication administrator, a positive group-based communication workspace add request decision, transmit a group-based communication workspace invite to a second client device associated with the second group-based communication user identifier; and
in response to receiving, from the second client device associated with the second group-based communication user identifier, a group-based communication workspace invite acceptance, add the group-based communication workspace identifier to a group-based communication approved workspaces list associated with the second group-based communication user identifier.

9. The computer-readable storage medium of claim 8, wherein the computer-readable storage medium includes instructions that when executed by the computer, further cause the computer to:
prior to assigning the group-based communication channel identifier to the group-based communication workspace add request, upon determining that one or more of the first client device associated with the first group-based communication user identifier or the second group-based communication user identifier associated with the group-based communication workspace add request is associated with a whitelist, automatically transmit the group-based communication workspace invite to the second client device.

10. The computer-readable storage medium of claim 8, wherein the group-based communication workspace add request comprises a plurality of group-based communication workspace add requests associated with a common group-based communication user identifier, wherein the plurality of group-based communication workspace add requests is consolidated into a group-based communication workspace add request batch, wherein the group-based communication workspace add request batch is assigned the group-based communication channel identifier, and wherein the instruction further cause the computer to render the group-based communication workspace add request within the group-based communication channel interface associated with the group-based communication channel identifier.

11. The computer-readable storage medium of claim 8, wherein the group-based communication workspace invite comprises a redirect to a validated external resource for completion of pre-access requirements, wherein the pre-access requirements are completed prior to adding the group-based communication workspace identifier to the group-based communication approved workspaces list for the second group-based communication user identifier.

12. The computer-readable storage medium of claim 8, wherein the computer-readable storage medium includes instructions that when executed by the computer, further cause the computer to:
upon receiving, from the third client device associated with the at least one group-based communication administrator, the positive group-based communication workspace add request decision, transmit to the first client device associated with the first group-based communication user identifier the positive group-based communication workspace add request decision.

13. The computer-readable storage medium of claim 8, wherein the computer-readable storage medium includes instructions that when executed by the computer, further cause the computer to:
prior to assigning the group-based communication channel identifier to the group-based communication workspace add request, and upon determining that one or more of the first client device associated with the first group-based communication user identifier or the second group-based communication user identifier associated with the group-based communication workspace add request is associated with a blacklist, automatically transmit to the first client device associated with the first group-based communication user identifier a negative group-based communication workspace add request decision.

14. A computer-implemented method for servicing a group-based communication system, the group-based communication system comprising a plurality of group-based communication channels organized among a plurality of group-based communication workspaces, the method comprising:

receiving, from a first client device associated with a first group-based communication user identifier, a group-based communication workspace add request, wherein the group-based communication workspace add request comprises a group-based communication workspace identifier and a second group-based communication user identifier;

assigning a group-based communication channel identifier to the group-based communication workspace add request, wherein the group-based communication channel identifier is associated with a group-based communication channel;

causing to render the group-based communication workspace add request within a group-based communication channel interface associated with the group-based communication channel identifier;

in response to receiving, from a third client device associated with at least one group-based communication administrator, a positive group-based communication workspace add request decision, transmitting a group-based communication workspace invite to a second client device associated with the second group-based communication user identifier; and in response to receiving, from the second client device associated with the second group-based communication user identifier, a group-based communication workspace invite acceptance, adding the group-based communication workspace identifier to a group-based communication approved workspaces list associated with the second group-based communication user identifier.

15. The computer-implemented method of claim 14, further comprising:

prior to assigning the group-based communication channel identifier to the group-based communication workspace add request, upon determining that one or more of the first client device associated with the first group-based communication user identifier or the second group-based communication user identifier associated with the group-based communication workspace add request is associated with a whitelist, automatically transmitting the group-based communication workspace invite to the second client device.

16. The computer-implemented method of claim 14, wherein the group-based communication workspace add request comprises a plurality of group-based communication workspace add requests associated with a common group-based communication user identifier wherein the plurality of group-based communication workspace add requests is consolidated into a group-based communication workspace add request batch, and wherein the group-based communication workspace add request batch is assigned the group-based communication channel identifier, and causing to render the group-based communication workspace add request within the group-based communication channel interface associated with the group-based communication channel identifier.

17. The computer-implemented method of claim 14, wherein the group-based communication workspace invite comprises a redirect to a validated external resource for completion of pre-access requirements, and wherein the pre-access requirements are completed prior to adding the group-based communication workspace identifier to the group-based communication approved workspaces list for the second group-based communication user identifier.

18. The computer-implemented method of claim 14, further comprising:

upon receiving, from the third client device associated with the at least one group-based communication administrator, the positive group-based communication workspace add request decision, transmitting to the first client device associated with the first group-based communication user identifier the positive group-based communication workspace add request decision.

19. The computer-implemented method of claim 14, further comprising:

upon receiving from the third client device associated with the at least one group-based communication administrator, a negative group-based communication workspace add request decision, transmitting to the first client device associated with the first group-based communication user identifier the negative group-based communication workspace add request decision.

20. The computer-implemented method of claim 14, further comprising:

prior to assigning the group-based communication channel identifier to the group-based communication workspace add request, and upon determining that one or more of the first client device associated with the first group-based communication user identifier or the second group-based communication user identifier associated with the group-based communication workspace add request is associated with a blacklist, automatically transmitting to the first client device associated with the first group-based communication user identifier a negative group-based communication workspace add request decision.

* * * * *